(12) United States Patent
Sessa

(10) Patent No.: US 7,815,408 B2
(45) Date of Patent: Oct. 19, 2010

(54) FASTENER ASSEMBLY RETENTION AND ALIGNMENT ELEMENT

(75) Inventor: Eugene Sessa, Harrison Township, MI (US)

(73) Assignee: Nylok, LLC, Macomb, MI (US)

( * ) Notice: Subject to any disclaimer, the term of this patent is extended or adjusted under 35 U.S.C. 154(b) by 9 days.

(21) Appl. No.: 12/077,191

(22) Filed: Mar. 17, 2008

(65) Prior Publication Data

US 2009/0232617 A1   Sep. 17, 2009

(51) Int. Cl.
*F16B 21/18* (2006.01)

(52) U.S. Cl. .................. 411/353; 411/301; 411/999; 411/904; 411/918

(58) Field of Classification Search .............. 411/301, 411/302, 441, 999, 339, 965, 111, 112, 132, 411/180, 154, 158, 901, 903, 979, 970, 258, 411/918; 427/195

See application file for complete search history.

(56) References Cited

U.S. PATENT DOCUMENTS

| | | | | |
|---|---|---|---|---|
| 3,221,790 A | * | 12/1965 | Poupitch | 411/301 |
| 3,515,418 A | * | 6/1970 | Nielsen, Jr | 403/109.5 |
| 3,561,075 A | * | 2/1971 | Selinko | 24/704.1 |
| 3,978,759 A | * | 9/1976 | Bakoledis | 411/441 |
| 4,435,112 A | * | 3/1984 | Becker | 411/368 |
| 6,025,019 A | * | 2/2000 | Duffy | 427/195 |
| 6,152,667 A | * | 11/2000 | LeVey | 411/521 |
| 6,371,707 B1 | * | 4/2002 | Schaty | 411/339 |
| 6,953,314 B2 | * | 10/2005 | Magagna | 411/433 |
| 7,029,221 B2 | * | 4/2006 | Kovac | 411/512 |
| 2008/0292426 A1 | * | 11/2008 | Snow et al. | 411/258 |

OTHER PUBLICATIONS http://www.forestcitytech.com Forest City Technologies, Inc. Innovation by Design—p. 1 of 1.

* cited by examiner

*Primary Examiner*—Gary Estremsky
(74) *Attorney, Agent, or Firm*—Niro, Heller & Niro

(57) ABSTRACT

A fastener assembly including a retention and alignment element used in combination with a first component having a cylindrical wall defining a bore and a second component having an elongated shaft for insertion into the bore of the first component. The retention and alignment element comprises a plurality of elongated polymeric protuberances, each having (i) a base fixed to the cylindrical wall of the first component, (ii) a height sufficient so that together the free ends of the protuberances define a passageway that creates an interference fit with the shaft of the second component, and (iii) a length sufficient to maintain the shaft of the second component generally collinear with the axis of the bore of the first component.

2 Claims, 1 Drawing Sheet

FASTENER ASSEMBLY RETENTION AND ALIGNMENT ELEMENT

BACKGROUND OF THE INVENTION

The present invention relates generally to fastener assemblies. More particularly, the invention relates to assemblies having one component with a bore or aperture into which a second component having a shaft in the form of a stud, rivet, bolt or screw is inserted and retained and aligned by means of a unique retention element.

It has been well known in the art to use a retention element in combination with a collar or bushing and a bolt or other shaft-like component to maintain the two components in assembled relation during storage, shipment and/or other pre-final assembly operations. Examples of such prior art devices are shown in U.S. Pat. Nos. 4,399,166 and 6,025,019. Such retention devices, however, may offset the shaft of the inserted component or are otherwise ill suited to maintaining the inserted component in concentric alignment with the outer component. A retention element having this additional alignment capability finds advantageous application in automated manufacturing processes where it is necessary to more precisely position the inserted component during various assembly operations.

SUMMARY OF THE INVENTION

The present invention is directed to a fastener assembly including a retention and alignment element used in combination with a first component having a cylindrical wall defining a bore and a second component having an elongated shaft for insertion into the bore of the first component. The retention and alignment element comprises a plurality of elongated polYmeric protuberances, each having (i) a base fixed to the cylindrical wall of the first component, (ii) a height sufficient so that together the free ends of the protuberances define a passageway that creates an interference fit with the shaft of the second component, and (iii) a length sufficient to maintain the shaft of the second component generally collinear with the axis of the bore of the first component.

The invention is also directed to a fastener assembly comprising a first component, a second component and a retention and alignment element. The first component is cylindrical and has a cylinder wall defining a bore and a slot in the cylinder wall thereby permitting its resilient compression or expansion. The second component has a shaft for insertion into the bore of the first component. The retention and alignment element comprises a coating of polymeric material on more than fifty percent of the circumference of the inside of the cylinder wall, the coating having a thickness sufficient to establish an interference fit with the shaft of the second component and an axial length sufficient to maintain the shaft of the second component generally collinear with the axis of the bore of the first component.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
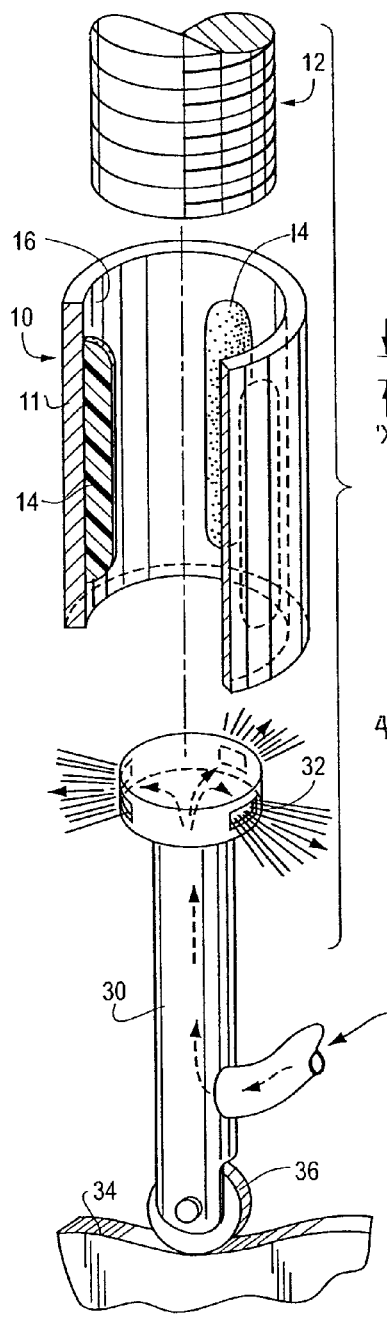
FIG. 1 is an exploded perspective view of one embodiment of the invention, with portions broken away for clarity of illustration and also showing apparatus useful in the construction of the embodiment.
Figure 1A:
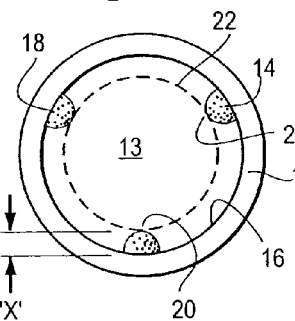
FIG. 1A is an end view of the embodiment illustrated in FIG. 1.

With reference to FIGS. 1 and 1A, a preferred fastener assembly embodiment in accordance with the invention is illustrated having a first component 10, a second component 12 and a retention and alignment element in the form of three protuberances 14. The first component is shown in this embodiment as a bushing having a cylindrical wall 11 defining a bore 13. The second component is shown as a threaded bolt, although any number of structures having a shaft sized to permit insertion into the first component 10 may be employed. The protuberances 14 have a base 18 fixedly secured to the inner surface of wall 11 and a free end 20. The protuberances 14 have a height "X" such that the free ends 20 of the protuberances define a passageway (depicted by the phantom line 22) that will establish a press fit between the two components when assembled. In this manner, the protuberances will retain the inserted component 12 within the first component 10 during storage, shipping or other handling or processing operations prior to final assembly in a finished product. In addition, at least three protuberances may be employed which are arranged around the circumference of wall 11 and have a length sufficient to maintain the inserted component 12 in generally concentric relation to the first component. In other words, the shaft of component 12 will be maintained in generally collinear relation to the axis of the bore in component 10.

This arrangement of the retention and alignment element will help to properly position the shaft of component 12 for subsequent assembly operations where, for example, a robotic assembler will be used to join or connect this assembly to other parts or assemblies of a larger article of manufacture.

In the fabrication of the embodiment shown in FIGS. 1 and 1A, an air borne powder stream is delivered to the inner surface of the wall 11 by means of a nozzle 30 with three discharge ports 32. The powder applied via nozzle 30 is a particulate thermoplastic resin blended with a blowing agent such as that disclosed in U.S. Pat. No. 6,025,019 whose disclosure is incorporated herein by reference. Importantly, the melting temperature of the thermoplastic resin is lower than the activating temperature of the blowing agent. In accordance with the present invention, the wall 11 is preheated in advance of the powder application step to a temperature above the resin melting temperature, but below the activation temperature of the blowing agent. As shown in FIG. 1, the nozzle is designed in a manner to permit its axial movement within bore 13 as the powder mixture is applied. This can be accomplished in any number of ways, for example using a cam 34 and cam follower 36 to drive the nozzle 30 along the axial extent of the bore 13 necessary to define the appropriate length of the protuberances 14. As the powder mixture is applied to the inner surface of preheated wall 11, it melts and adheres to the wall surface. Subsequently, and after the nozzle 30 has been retracted from bore 13, the component 10 is heated further to raise the temperature of the melted powder mixture above the activation temperature of the blowing agent. This causes a foaming action to occur and raises the protuberances to the desired height "X" necessary to establish a press fit between the two components for the particular assembly. This sequence of processing steps allows the nozzle 30 to be easily inserted and withdrawn from bore 13 while still achieving a substantial height to the protuberances 14. The three protuberances in the illustrated embodiment are positioned at equally spaced locations about the circumference of the inner surface of wall 11, but other numbers and arrangements may be useful with other component designs.

Figure 2:
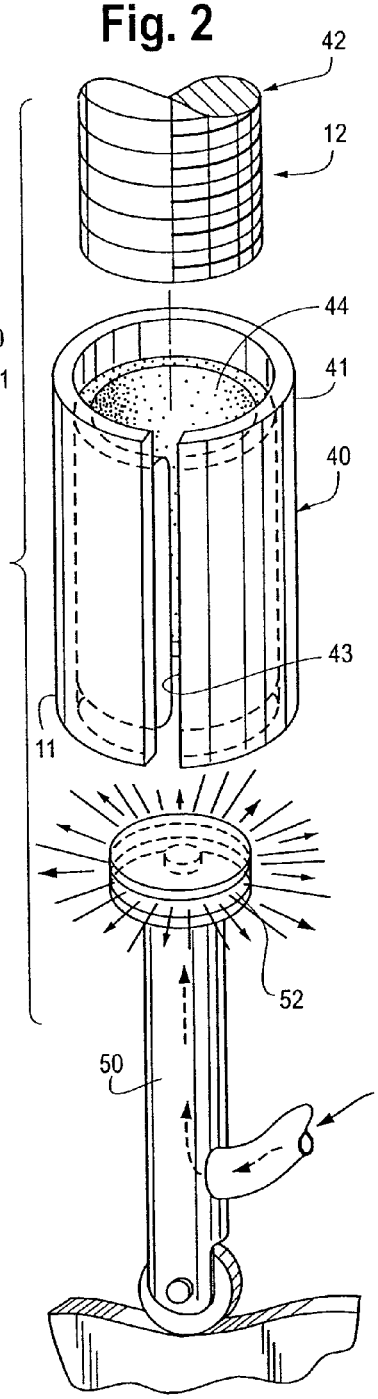
FIG. 2 is also an exploded perspective view showing another embodiment of the invention and apparatus useful in its construction.
Figure 2A:
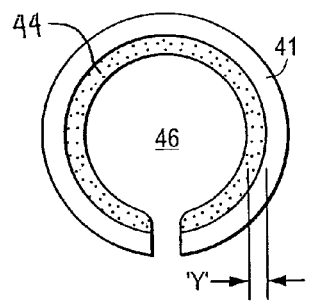
FIG. 2A is an end view of the embodiment illustrated in FIG. 2.

FIGS. 2 and 2A illustrate another embodiment of the invention. In this embodiment, the first component takes the form of a bushing 40 having a cylindrical wall 41 and the retention and alignment element takes the form of an expanded coating 44 applied to the inner surface of wall 41. The bushing 40 also has a slot 43 extending from one end to the other, thereby forming a split bushing that can be compressed slightly to facilitate its insertion into a receiving aperture. The coating 44 is made of the same polymeric resin and blowing agent mixture as described previously and has a thickness "Y" once again necessary to form a passageway 46 to accept a second component 42 in press fit relation. In addition, because the bushing 40 is split, the dimensional tolerances between the two components and the coating are not as critical as they might otherwise be.

The coating 44 is formed using a nozzle 50 which operates much the same as nozzle 30, with the exception that a continuous annular port 52 is employed to apply the powder mixture to the inside surface of wall 41.

It will be appreciated by those skilled in the art that various changes and modifications can be made to the illustrated embodiments without departing from the spirit of the present invention. All such modifications and changes are intended to be covered by the appended claims.

The invention claimed is:

1. A fastener assembly including a retention and alignment element used in combination with a first component having a cylindrical wall defining a bore and a second component having an elongated shaft for insertion into the bore of the first component, said retention and alignment element comprising:

a plurality of elongated polymeric protuberances applied to the first component by directing an air born resin powder stream to the cylindrical wall and curing the resin thereon, each protuberance having (i) a base adhering to the cylindrical wall along the entire length of the protuberance, (ii) a height sufficient so that together the free ends of the protuberances define a passageway that creates an interference fit with the shaft of the second component and the free ends engage the shaft of the second component along substantially the entire length of the protuberances, and (iii) a length sufficient to maintain the shaft of the second component generally collinear with the axis of the bore of the first component.

2. The fastener assembly of claim 1 wherein the polymeric protuberances are comprised of an elastomeric resin and a blowing agent so that upon curing the protuberances exhibit a cell structure and a degree of elasticity to permit deformation upon assembly of the two components.

* * * * *